(12) United States Patent
Andersen et al.

(10) Patent No.: US 8,495,911 B2
(45) Date of Patent: Jul. 30, 2013

(54) WIND TURBINE SITING AND MAINTENANCE PREDICTION

(75) Inventors: Kim Emil Andersen, Nørresundby (DK); Lars Christian Christensen, Viborg (DK); Henrik Kanstrup Jørgensen, Struer (DK)

(73) Assignee: Vestas Wind Systems A/S, Randers SV (DK)

( * ) Notice: Subject to any disclaimer, the term of this patent is extended or adjusted under 35 U.S.C. 154(b) by 383 days.

(21) Appl. No.: 12/675,354

(22) PCT Filed: Aug. 29, 2008

(86) PCT No.: PCT/EP2008/061397
§ 371 (c)(1),
(2), (4) Date: Jul. 21, 2010

(87) PCT Pub. No.: WO2009/027509
PCT Pub. Date: Mar. 5, 2009

(65) Prior Publication Data
US 2010/0312594 A1     Dec. 9, 2010

(30) Foreign Application Priority Data
Aug. 31, 2007    (WO) ................. PCT/EP2007/059144

(51) Int. Cl.
*A63B 53/00*    (2006.01)
(52) U.S. Cl.
USPC .......................... 73/170.01; 73/170.16; 702/3
(58) Field of Classification Search
None
See application file for complete search history.

(56) References Cited

U.S. PATENT DOCUMENTS

| | | | |
|---|---|---|---|
| 6,320,272 B1 * | 11/2001 | Lading et al. | 290/44 |
| 7,100,438 B2 * | 9/2006 | LeMieux | 73/170.16 |
| 7,228,235 B2 * | 6/2007 | Grzych et al. | 702/3 |

(Continued)

FOREIGN PATENT DOCUMENTS

| | | |
|---|---|---|
| EP | 1194590 | 4/2002 |
| EP | 1194690 | 4/2002 |

(Continued)

OTHER PUBLICATIONS

S.A. Grady, M.Y. Hussaini, M.M. Abdullah, Placement of wind turbines using genetic algorithms, Renewable Energy, vol. 30, Issue 2, Feb. 2005, pp. 259-270, ISSN 0960-1481, 10.1016/j.renene.2004.05.007.*

(Continued)

*Primary Examiner* — Gurkanwaljit Singh
(74) *Attorney, Agent, or Firm* — Patterson & Sheridan, LLP

(57) ABSTRACT

A computer-implemented method for determining a site for a wind turbine within a confined geographical target region on the basis of an estimate of a maintenance parameter comprises determining a wind climate at the target region, the wind climate including e.g. average wind speed, pre-dominant wind directions, or turbulence intensities. A function expressing the maintenance parameter of the wind turbine as a function of the flow characteristics is defined, and the function is applied to the geographical position to compute an estimated value of the maintenance parameter at that position. Meteorological measurements may be used to obtain the flow characteristics. Wind measurements performed at one location may be numerically extrapolated by numerical methods, e.g. by CFD, to other locations. The maintenance parameter may be expressed as a maintenance risk, number of component replacements, or as a maintenance cost per energy unit. Three-dimensional visualization of wind turbines, e.g. in GoogleEarth™ is further provided by the invention.

13 Claims, 3 Drawing Sheets

U.S. PATENT DOCUMENTS

| | | | |
|---|---|---|---|
| 7,322,794 B2 * | 1/2008 | LeMieux et al. | 416/40 |
| 7,403,854 B1 * | 7/2008 | Hurley et al. | 702/3 |
| 2003/0149584 A1 | 8/2003 | Wobben | |
| 2004/0230377 A1 * | 11/2004 | Ghosh et al. | 702/3 |
| 2006/0005617 A1 * | 1/2006 | LeMieux | 73/170.01 |
| 2006/0070435 A1 * | 4/2006 | LeMieux et al. | 73/168 |
| 2006/0082160 A1 * | 4/2006 | Lee | 290/55 |
| 2006/0173623 A1 * | 8/2006 | Grzych et al. | 702/3 |
| 2007/0050137 A1 * | 3/2007 | Woon et al. | 701/219 |
| 2009/0073034 A1 * | 3/2009 | Lin | 342/357.07 |

FOREIGN PATENT DOCUMENTS

| | | |
|---|---|---|
| EP | 1569153 A2 | 8/2005 |
| EP | 1569153 A3 | 8/2005 |
| KR | 5063616 | 6/2005 |
| WO | WO 02/01251 A2 | 1/2002 |
| WO | WO 2005/093435 A1 | 10/2005 |

OTHER PUBLICATIONS

Elkinton, C., Manwell, J., and McGowan, J. Offshore Wind Farm Layout Optimization (OWLFO) Project: Priliminary Results. In 44th AIAA Aerospace Sciences Meeting and Exhibit, AIAA (Reno, Nevada Jan. 2006).*

Elkinton, C.. Offshore wind farm layout optimization. Ph.D. dissertation, University of Massachusetts Amherst, United States—Massachusetts. Retrieved May 6, 2012.*

U Aytun Ozturk, Bryan A Norman, Heuristic methods for wind energy conversion system positioning, Electric Power Systems Research, vol. 70, Issue 3, Aug. 2004, pp. 179-185, ISSN 0378-7796, 10.1016/j.epsr.2003.12.006.*

International Preliminary Report on Patentability dated Mar. 2, 2010.

International Search Report dated Jan. 20, 2009/.

* cited by examiner

WIND TURBINE SITING AND MAINTENANCE PREDICTION

PRIORITY CLAIM

This is a U.S. national stage of application No. PCT/EP2008/061397, filed on Aug. 29, 2008. Priority is claimed on the following application: PCT Application No. PCT/EP2007/059144 Filed: Aug. 31, 2007, the content of which is incorporated here by reference.

TECHNICAL FIELD

The present invention relates to the fields of wind turbine siting and wind turbine maintenance prediction. More specifically, the invention provides a computer system and a method for estimating one or more maintenance parameters of a wind turbine, such as component maintenance costs or expected number of component replacements during the life time of the wind turbine. The invention further provides a method for determining a geographical position of a wind turbine. Finally, the invention provides a computer system for providing a three-dimensional visualization of a wind turbine at its intended site.

BACKGROUND OF THE INVENTION

Siting of wind turbines is burdensome, in particular in respect of on-shore turbines. Geographical regions must be identified, which are appropriate in terms of wind conditions as well as in terms of aesthetic appearance and possible noise annoyances, and relevant public authorities must approve the erection of a wind turbine or a wind turbine farm in a certain region. Once a geographical region has been identified as a site for a wind turbine or a wind turbine farm, much effort is usually put into detailed siting to optimize power output of the wind turbine(s). Such optimization may include empirical or numerical wind flow determination in the geographical region of interest to determine wind climate, including average wind speed and pre-dominant wind directions. The wind speed at various locations within the region of interest may be translated into a potential power output of the wind turbine to be sited. Typically, the potential power output varies from location to location within the region. The exact position of a single wind turbine is often chosen to be that position, at which the potential power output is highest. Likewise, siting of wind farms typically aims at distributing the wind turbines to achieve a maximum power output.

It will be appreciated that much is done in terms of aerodynamic site optimisation to ensure maximum power output. However, maintenance costs have hitherto been disregarded when siting wind turbines or wind turbine farms, in spite of the fact that maintenance, including component replacement, presents a significant cost item in wind turbine budgets. Hence, certain aspects of the present invention aim at taking maintenance parameters into consideration in a wind turbine siting computer system and method.

Other aspects of the present invention relate to visualization of wind turbines to be erected at a certain geographical location. Such visualization is relevant not only to provide an aesthetical comprehension of the visual impacts of a wind turbine or a wind turbine farm in a certain geographical area, but also to provide siting engineers with a technical comprehension, e.g. to allow engineers to spot inexpedient mutual positions of two wind turbines, such as positions in which a wake effect downstream of one wind turbine could cause undesirable turbulence at or near a second wind turbine. In other words, with the experience of skilled wind turbine siting engineers, an accurate visualization of a projected wind turbine or wind turbine farm may replace or at least reduce the need for expensive numerical computations and/or wind tunnel tests.

Given the above background, it is an object of preferred embodiments of the present invention to provide a system and a method, which allows maintenance costs to be taken into account during siting of wind turbines. It is a further object of preferred embodiments of the present invention to provide a method and a system, which allows wind turbines to be sited at positions, in which the ratio between power output and maintenance costs is maximized. It is a further object of preferred embodiments of the present invention to provide a visualization tool, which provides an improved technical and aesthetic comprehension of projected wind turbines.

DESCRIPTION OF THE INVENTION

In a first aspect, the invention provides a computer-implemented method for determining a position for at least one wind turbine within a confined geographical target region for the wind turbine, the method comprising the steps of:
  defining a plurality of geographical locations within the target region;
  determining a plurality of wind flow characteristics in each of said geographical locations, said flow characteristics including at least a wind velocity and a turbulence intensity;
  applying a function, which expresses a maintenance parameter of the at least one wind turbine as a function of at least said flow characteristics, to each of the geographical locations within the target region to compute a value of the at least one maintenance parameter at each of the geographical locations within the target region;
  selecting one of the geographical locations as the position for the at least one wind turbine on the basis of the computed maintenance parameter values.

In a second aspect, the invention provides a computer system for determining a site for at least one wind turbine within a confined geographical target region for the wind turbine, the computer system being programmed to:
  define a plurality of geographical locations within the target region;
  determine a plurality of wind flow characteristics in each of said geographical locations, said flow characteristics including at least a wind velocity and a turbulence intensity;
  apply a function, which expresses a maintenance parameter of the at least one wind turbine as a function of at least said flow characteristics, to each of the geographical locations within the target region to compute a value of the at least one maintenance parameter at each of the geographical locations within the target region;
  select one of the geographical locations as the position for the at least one wind turbine on the basis of the computed maintenance parameter values.

The present inventors have realised that the need for maintenance and hence also maintenance costs can be considerably reduced by optimising siting of wind turbines with respect to such wind conditions which are known to cause component failure or component fatigue. In particular, wind speed and wind speed fluctuations (i.e. turbulence) stress wings and drive chain components, and high turbulence intensities result in the need for frequent component replacement or repair and hence cause relatively high maintenance costs. Also, high wind average wind speeds may, though beneficial with respect to power production, be disadvantageous in terms of component stress and hence maintenance costs. Due to the fact that the first, second and third aspects include application of a function, which takes wind velocity and turbulence intensity into account, the effects of these crucial characteristics on the maintenance parameter and hence on maintenance costs may be predicted already at the siting stage of wind turbine engineering.

The maintenance parameter of the wind turbine may, in addition to being a function of flow characteristics, further is be function of a time-dependent variable, such as time or accumulated power production of the at least one wind turbine. The step of applying the abovementioned function may include estimating the expected number of replacements of a given wind turbine component during the expected life time of the wind turbine. For example, the maintenance parameter may include a maintenance cost expressed as a monetary amount per energy unit produced.

A sum of computed maintenance costs of a plurality of wind turbine components at a given time may be computed, and the sum may be divided by the accumulated energy produced at that time to obtain an expression of the maintenance costs as a monetary amount per energy unit produced.

The maintenance parameter may e.g. be expressed as a number of expected replacements of a given component within the nominal lifetime of the wind turbine, e.g. the expected number of gearbox replacements in 20 years. Alternatively, the maintenance parameter may be expressed as a maintenance cost in respect of one or more components or of the entire wind turbine or wind turbine farm. The maintenance cost may for example be expressed as the total maintenance cost divided by the energy produced by the wind turbine or wind turbine farm during its life time, such as for example 10 USD/MWh. The maintenance costs may also be expressed as a risk or probability that maintenance costs will accumulate to an amount above a certain threshold limit.

The wind flow characteristics may be derived fully or partially from meteorological measurements, by which meteorological measurement data of wind velocities, wind directions and turbulence intensities are obtained. The meteorological measurements may e.g. be performed over a period of time of at least two weeks, preferably at least two months, more preferably at least a year, or even two or more years. An appropriate period should be allowed for the measurements to obtain statistically reliable data. Usually a period of about one year is regarded as appropriate. In particular, average wind speed and pre-dominant wind directions may be determined.

Prior to the step of identifying the at least one geographical position, the method and computer systems of the first and second aspects of the invention may perform the following steps:
  identifying a confined geographical target region, whereby the at least one geographical position is within the geographical target region;
  defining a plurality of geographical locations within the target region, whereby each of said at least one geographical position is within one of the geographical locations;
  applying the function to each of the geographical locations to estimate the value of the at least one maintenance parameter at each one of the geographical locations.

Hence, a plurality of possible geographical locations for one or more wind turbines may be assessed. If more locations are assessed than wind turbines are to be sited, the optimal locations may be selected, i.e. those locations showing the most promising maintenance parameter.

The meteorological measurements may be performed at all relevant positions. However, in a preferred embodiment of the invention, the measurements are performed at one single position only. This position may be within the geographical target region or outside the geographical target region. In such an embodiment, the invention further comprises, prior to the step of applying the aforementioned function to each of the geographical locations:
  extrapolating (i.e. projecting) the meteorological measurement data by means of a numerical method to obtain estimated wind flow characteristics in each of the geographical locations within the geographical region. The wind flow characteristics estimated by extrapolation, as well as optionally the measurements themselves, may then be provided as an input to said function. The numerical method used for extrapolation may e.g. be based on computational fluid dynamics (CFD), taking the measured data, geographical location of the data, as well as a 2- or 3-dimensional model (digital grid) of the geographical target region as inputs.

A representation of the computed maintenance parameter may be displayed in corresponding positions in a map of the geographical target region. For example, areas of relatively high maintenance costs may be coloured with a first set of colour nuances, e.g. red-based colours, whereas areas of relatively low maintenance costs may be coloured with a second set of colour nuances, e.g. green-based colours.

In embodiments, in which at least one maintenance parameter of a plurality of wind turbines is estimated, the step of applying the aforementioned function may take mutual aerodynamic effects of the wind turbines into account. In particular, wake effects may be taken into account.

In a third aspect, the present invention provides a computer system for visualizing a position of at least one wind turbine in a geographical terrain, the computer system including a monitor and a database storing three-dimensional visualization data of the surface of at least a portion of the Earth, the computer system being programmed to:
  receive coordinates of the position of the at least one wind turbine;
  receive a digital image of the at least one wind turbine;
  superimpose the digital image on said three-dimensional visualization data at the coordinates of the position of the at least one wind turbine; and
  cause the monitor to display a three-dimensional image of the at least one wind turbine as located at said coordinates.

The visualization rendered possible by the third aspect of the invention not only provides an aesthetical comprehension of the visual impacts of a wind turbine or a wind turbine farm in a certain geographical area, but provides also siting engineers with a technical comprehension, e.g. to allow engineers to spot inexpedient mutual positions of two wind turbines, such as positions in which a wake effect downstream of one wind turbine could cause undesirable turbulence at or near a second wind turbine. With the experience of skilled wind turbine siting engineers, an accurate visualization of a projected wind turbine or wind turbine farm may replace or at least reduce the need for expensive numerical computations and/or wind tunnel tests.

The computer system may be further programmed to receive a user-defined view angle and cause the monitor to display the three-dimensional image as seen from the user-defined view angle. For example, the view angle may be continuously alterable, controlled e.g. by a user-operated device, such as a mouse, trackball or joystick.

A visualization of wind turbines or windfarms and risk overlay maps (see the below description of expected risk, and FIG. 4) may for example be visualized in Google Earth™.

Before the implementation of a windfarm, all the nescessary 2D and 3D objects should be present. The 3D models may either be prerendered solid object models or texture mapped models, such as COLLADA interchangeable objects. A person skilled in the art of computer programming is capable of writing a computer program capable of scaling and rotating 3D objects in Google Earth™. Alternatively one has to create several prerendered models of the same wind turbine, but with different heights and dimensions. As for the risk overlay map, the program may simply generate a JPG image file, which can be recognized by and loaded into Google Earth™, and imposed on the landscape when the geographical coordinates are known.

A program may be used to generate either a Google Earth™ compatible KML file or a alternatively a KMZ archive. A KML file is a structured XML type file that Google Earth™ can interpret, and it contains information on the position, elevation, size and rotation of 2D flat images and 3D elements as well as defining the position of the camera.

Alternatively one can develop a program that creates and assembles a KMZ archive file containing all elements used to make a Google Earth™ visualization. A KMZ file is in essence just a renamed winzip archive that contains 3D models, 2D textures and images and the KML file describing the positions, elevation of the objects etc. The KML file must describe which images and 3D models to load, which folder they are located in and where to put them.

Embodiments of the first, second, and third aspects of the invention will now be described further with reference to the accompanying drawings, in which.

EXPECTED NUMBER OF REPLACEMENTS

Figure 1:
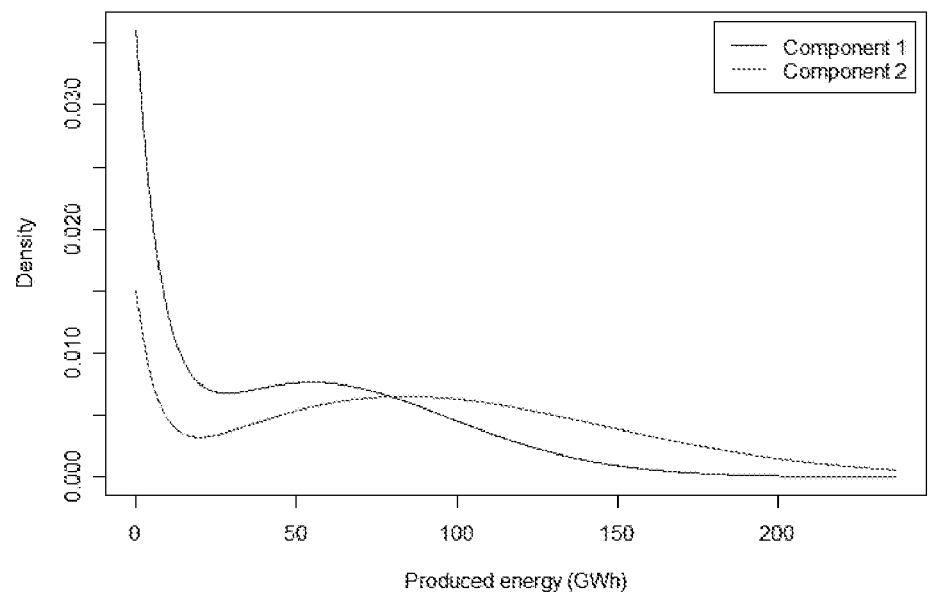
FIG. 1 shows an example of life time distributions for two components of a wind turbine.

Assume that the life time of a particular wind turbine component X (e.g. gearbox, generator, blade etc.) is described by a probability density function $f_X(t)$, where t can be time measured in years or energy produced since installation of the component. The density function should be adjusted for site specific climatic conditions and must mimic both component fatigue damage, infant mortality and failure due to e.g. grid failure etc. This typically implies that the density function is a mixture of different density functions, e.g.

$$f_x(t) = \sum_{q=1}^{Q} w_q F_x^q(t),$$

with weights $w_q > 0$ and $$\sum_{q=1}^{Q} w_q = 1.$$

The Q different density functions involved in the mixture may typically come from a class of exponential families; i.e. one may choose $$f_x^1(t) = A_1 \exp(-\alpha_1 t)$$

$$f_x^2(t) = \frac{k_2}{\lambda_2} \left(\frac{x}{\lambda_2}\right)^{k_2-1} \exp(-(x/\lambda_2)^{k_2})$$

where, for example, $f_X^1(t)$ and $f_X^2(t)$ describe component failure due to infant mortality and fatigue damage, respectively. The parameters $A_1$, $\alpha_1$, $k_2$ and $\lambda_2$ may depend on specific wind conditions, e.g. wind speed, turbulence intensity, etc. See FIG. 1 for examples of density functions.

The mean component replacement rate $n_X(t)$ for component X can be estimated via convolution of the life time density function $$n_x(t) = f_x(t) + \int_0^t n_x(t-s) f_x(s) \, ds,$$

from which the total number of replacements, say $N_X(t)$, since installation may be computed as $$N_x(t) = \int_0^t n_x(t) dt. \quad (1)$$

The uncertainty of the estimator $N_X(t)$ cannot be assessed in a closed form expression and consequently a simulation based approach is taken. Thus a set of M random variables $T_X^{(1)}, T_X^{(2)}, \ldots, T_X^{(M)}$ may be simulated from $f_X(t)$ to construct the random variable $$T_X^L(m) = \sum_{i=1}^{m} T_X^{(i)}$$

denoting the total life time of the first m components. Consequently a simulated estimate of the total number of replacements made up to time t is given by $N_X^S(t) = \min\{m | T_X^L(m) > t\}$.

Hereby the total number of replacements made at time t is given by $N_X^S(t)$ for that specific range of simulated random variables. Repeating the above simulation procedure K times provides the following set of realisations $N_X^{S(1)}(t), \ldots, N_X^{S(K)}(t)$ allowing for adequate inference on the mean number of total replacements made at time t. The mean number of replacements to expect at time t is then given by the unbiased estimate $$\overline{N}_X^S(t) = \frac{1}{K} \sum_{k=1}^{K} N_X^{S(k)}(t). \quad (2)$$

Note that adequate inference on NX(t) allows for optimum maintenance logistic as the number of components required for turbine operation can be predicted. Hence wind turbine availability can be optimized.

Expected Costs

To determine the overall expected maintenance costs for a single wind turbine the cost for replacing the various components is required. Assume that L components are under consideration, i.e. components $X_1, X_2, \ldots, X_L$ are present. The corresponding costs for replacing one of these components are given by the cost vector $C=(c_1, c_2, \ldots, c_L)$.

Repeating the procedure described above for all L different components K times allows for computation of the total cost $C^{(k)}(t)$ for case k at time t by $$C^{(k)}(t) = N_{X_1}^{S(k)}(t)c_1 + N_{X_2}^{S(k)}(t)c_2 + \ldots + N_{X_L}^{S(k)}(t)c_L = \sum_{i=1}^{L} N_{X_i}^{S(k)}(t)c_i.$$

The total cost for the K simulated cases can easily be computed by $$C(t)=K(t) \cdot C,$$

where the component matrix K(t) is defined as $$K(t) = \begin{bmatrix} N_{X_1}^{S(1)}(t) & N_{X_2}^{S(1)}(t) & \cdots & N_{X_L}^{S(1)}(t) \\ N_{X_1}^{S(2)}(t) & N_{X_2}^{S(2)}(t) & \cdots & N_{X_L}^{S(2)}(t) \\ \vdots & \vdots & \ddots & \vdots \\ N_{X_1}^{S(K)}(t) & N_{X_2}^{S(K)}(t) & \cdots & N_{X_L}^{S(K)}(t) \end{bmatrix}.$$

The mean total cost to expect at time t is then given by the unbiased estimate $$C_T(t) = \frac{1}{K}\sum_{k=1}^{K} C^{(k)}(t). \quad (3)$$

In order to determine a $(1-\alpha) \cdot 100\%$ credible interval for the expected total cost the sample $C^{(1)}(t), C^{(2)}(t) \ldots, C^{(K)}(t)$ may simply be sorted into an ordered sequence, and the $\alpha/2^{th}$ lowest total cost and the $(1-\alpha/2)^{th}$ upper total cost may be extracted for wind turbine maintenance. For example, if $\alpha=0.05$ and $K=10000$ the $250^{th}$ and $9750^{th}$ observations are recorded from the ordered sequence of total costs at time t.

EXAMPLE

In the following example only two types of components $X_1$ and $X_2$ are considered, i.e. L=2. The cost prices are for illustration set to $c_1=600\,000$ € and $c_2=150\,000$ €. A wind turbine design life time of 20 years is used in the calculations. The probability density functions $f_1(t)$ and $f_2(t)$ are shown in FIG. 1, showing life time distributions for the two components. Both distributions are obtained as weighted mixtures of exponential distributions and Weibull distributions.

Figure 2:
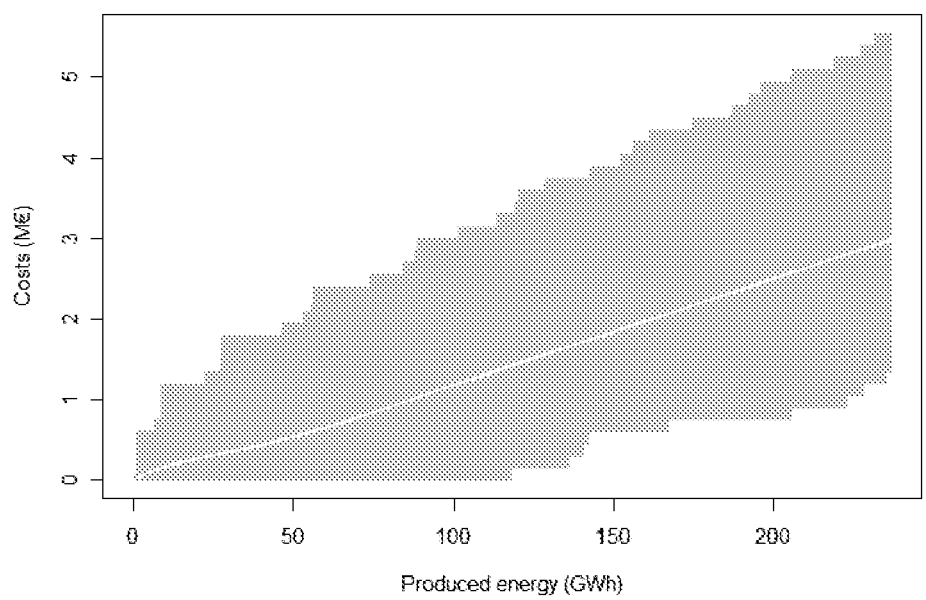
FIG. 2 shows an example of accumulated expected total costs for one wind turbine as function of produced energy.

The total costs are simulated according to the procedure prescribed above using K=10 000 repetitions to obtain the diagram of FIG. 2, showing accumulated expected total costs for one wind turbine as function of produced energy. Imposed is a 95% credible interval for the total cost. It follows from FIG. 2 that when the wind turbine has produced 200 GWh, the expected cost is approximately 2.5 million € with an upper 95% credible limit at 5.0 million €.

Figure 3:
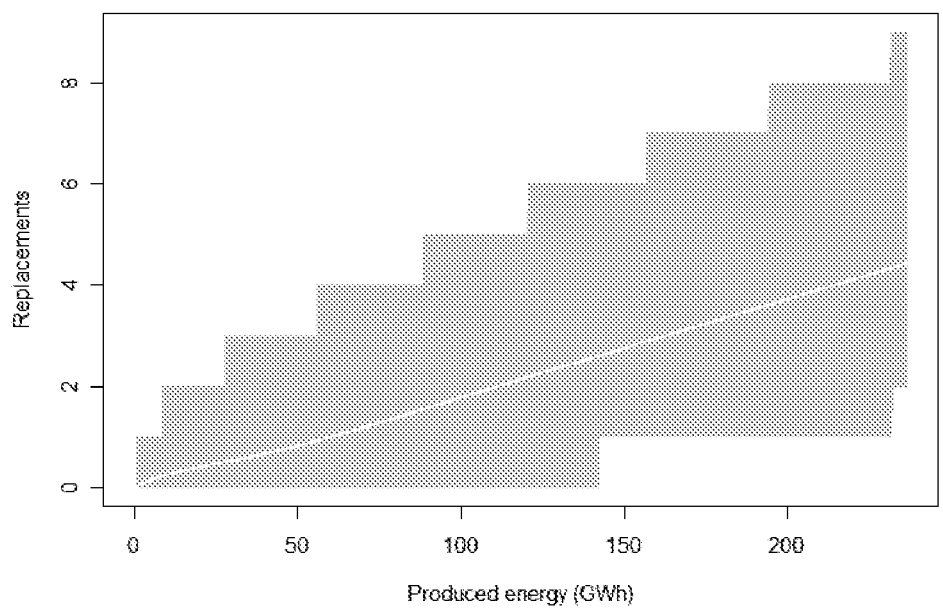
FIG. 3 shows an example of accumulated component replacements.

In a similar the number of component replacements is determined, see for example FIG. 3 for the total component replacements for component 1 (FIG. 3 showing accumulated component replacement for Component 1). From here it is seen that one should expect 3.7 component 1 replacements on the average at 200 GWh, whereas with 95% credibility one should expect between 1 and 8 replacements.

Expected Risk

The overall risk related to a wind turbine may be defined as the total cost at time t divided by the energy produced at that time. For convenience t=20 years is used as wind turbine design life time. For the example presented in FIG. 2 the total cost at 237 GWh produced energy is expected to be 2 980 000 €, i.e. the maintenance cost is 12.6 €/MWh. The risk related to a wind turbine is defined by the maintenance cost.

Figure 4:
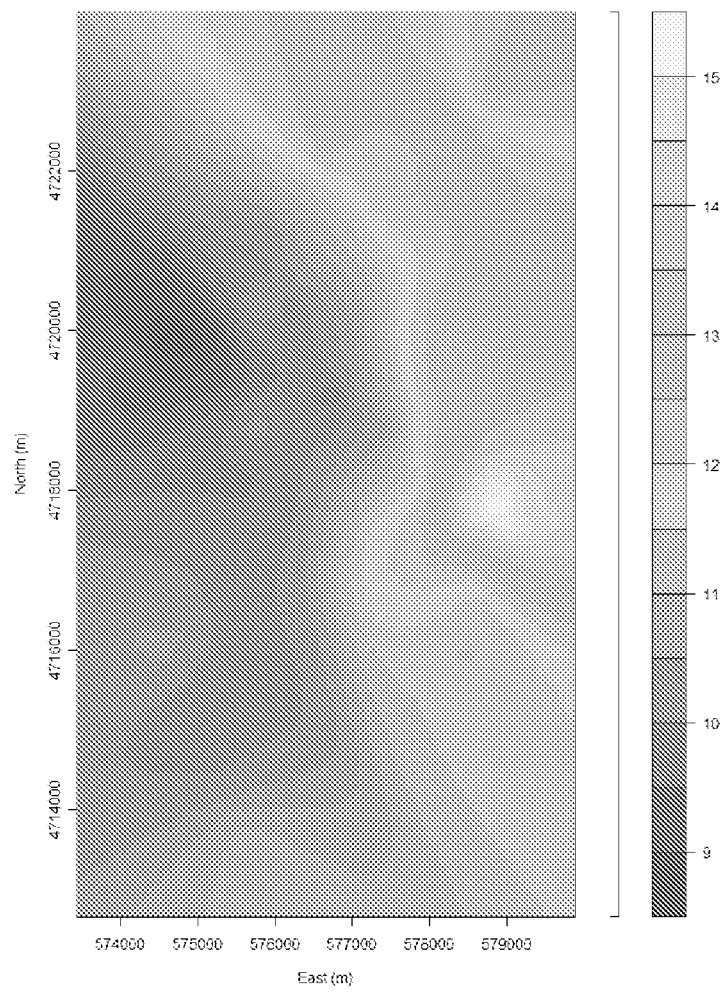
FIG. 4 shows an example of a risk map of a certain geographical region.

Using computer intensive software tools (e.g. WAsP, Wind Atlas Analysis and Application Program, or Coupled Fluid Dynamics based packages) for evaluation and simulation of terrain specific wind conditions one may assess the risk at any location within a site. This gives rise to a risk map, see FIG. 4 for details, FIG. 4 showing a risk map. Dark areas represent low maintenance costs, whereas bright areas represent particularly expensive turbine locations.

It will be appreciated that the following embodiments are embraced by the scope of the present invention:

1. A computer system for estimating at least one maintenance parameter of at least one wind turbine, the computer system including an input device for receiving data identifying a confined geographical target region for the wind turbine, the computer system being programmed to:
   define a plurality of geographical locations within the target region;
   determine a plurality of wind flow characteristics in each of said geographical locations, said flow characteristics including at least a wind velocity and a turbulence intensity;
   apply a function, which expresses the maintenance parameter of the wind turbine as a function of at least said flow characteristics, to each of the geographical locations within the target region to compute a value of the at least one maintenance parameter at each of the geographical locations within the target region;
   the computer system further including an output device for outputting a representation of the computed maintenance parameter values.

2. A computer system according to embodiment 1, the computer system being programmed to:
   receive, through said input device, meteorological measurement data obtained at least one position, said meteorological data including at least wind velocities, wind directions and turbulence intensities;
   extrapolate the meteorological measurement data by means of a numerical method to obtain said plurality of wind flow characteristics in each of the geographical locations within the geographical region.

3. A computer system according to embodiment 1 or 2, wherein the output device includes a monitor, and wherein the representation of the computed maintenance parameter values includes a map of the geographical target region, in which the computed maintenance parameter value in each of the geographical locations is represented in the corresponding positions in the map.

4. A computer system according to any of the preceding embodiments, wherein said function expressing the maintenance parameter of the wind turbine further is a function of a time-dependent variable.

5. A computer system according to embodiment 4, wherein the time-dependent variable is one of: time and accumulated power production of the at least one wind turbine.

6. A computer system according to any of the preceding embodiments, wherein the at least one maintenance parameter is a maintenance parameter of at least one component of the wind turbine.

7. A computer system according to any of the preceding embodiments, further programmed to, during application of said function, to estimate the expected number of replacements of a given wind turbine component during the expected life time of the wind turbine.

8. A computer system according to any of the preceding embodiments, wherein the maintenance parameter includes a maintenance cost expressed as a monetary amount per energy unit produced.

9. A computer system according to embodiment 8, wherein the computer system is programmed to compute the maintenance costs as the sum of computed maintenance costs of a plurality of wind turbine components at a given time divided by the accumulated energy produced at that time.

10. A computer system according to any of the preceding embodiments, further programmed to estimate at least one maintenance parameter of a plurality of wind turbines, whereby the computer system is programmed to apply said function to take mutual aerodynamic effects of the wind turbines into account.

11. A method of estimating a maintenance parameter of at least one wind turbine, the method comprising the steps of:
   identifying at least one geographical position of the at least one wind turbine;
   determining a plurality of wind flow characteristics at the at least one geographical position, said flow characteristics including at least a wind velocity and a turbulence intensity;
   defining a function, which expresses said maintenance parameter of the at least one wind turbine as a function of at least said flow characteristics;
   applying said function to the at least one geographical position to compute an estimated value of the at least one maintenance parameter at the at least one position.

12. A method according to embodiment 11, wherein the step of determining the wind flow characteristics includes the step of performing meteorological measurements to obtain meteorological measurement data of wind velocities, wind directions and turbulence intensities.

13. A method according to embodiment 11 or 12, further comprising prior to said step of identifying the at least one geographical position:
   identifying a confined geographical target region, whereby said at least one geographical position is within the geographical target region;
   defining a plurality of geographical locations within the target region, whereby each of said at least one geographical position is within one of the geographical locations;
   applying said function to each of the geographical locations to estimate the value of the at least one maintenance parameter at each one of the geographical locations.

14. A method according to embodiment 12 and 13, wherein said meteorological measurements are performed at one position, the method further comprising, prior to the step of applying said function to each of the geographical locations:
   extrapolating the meteorological measurement data by means of a numerical method to obtain estimated wind flow characteristics in each of the geographical locations within the geographical region, and subsequently, providing the estimated wind flow characteristics as an input to said function.

15. A method according to any of embodiments 11-14, further comprising the step of displaying a representation of the computed maintenance parameter in corresponding positions in a map of the geographical target region.

16. A method according to any of embodiments 11-15, wherein said function expressing the maintenance parameter of the wind turbine further is a function of a time-dependent variable.

17. A method according to embodiment 16, wherein the time-dependent variable is one of: time and accumulated power production of the at least one wind turbine.

18. A method according to any of embodiments 11-17, wherein the at least one maintenance parameter is a maintenance parameter of at least one component of the wind turbine.

19. A method according to any of embodiments 11-18, wherein the step of applying said function includes estimating the expected number of replacements of a given wind turbine component during the expected life time of the wind turbine.

20. A method according to any of embodiments 11-19, wherein the maintenance parameter includes a maintenance cost expressed as a monetary amount per energy unit produced.

21. A method according to embodiment 20, comprising the step of computing the maintenance cost includes computing a sum of computed maintenance costs of a plurality of wind turbine components at a given time and dividing said sum by the accumulated energy produced at that time to obtain an expression of the maintenance costs as a monetary amount per energy unit produced.

22. A method according to any embodiments 11-21, comprising the step of estimating at least one maintenance parameter of a plurality of wind turbines, and wherein the step of applying said function takes mutual aerodynamic effects of the wind turbines into account.

23. A method of determining a geographical position for a least one wind turbine, the method comprising the steps of:
   identifying a confined geographical target region for the wind turbine;
   defining a plurality of geographical locations within the target region;
   determining a plurality of wind flow characteristics in each of said geographical locations, said flow characteristics including at least a wind velocity and a turbulence intensity;
   defining a function, which expresses a maintenance parameter of the wind turbine as a function of at least said flow characteristics;
   applying said function to each of the geographical locations within the target region to compute a value of the at least one maintenance parameter at each of the geographical locations within the target region;
   selecting one of the geographical locations as the position for the at least one wind turbine on the basis of the computed maintenance parameter values.

24. A computer system for visualizing a position of at least one wind turbine in a geographical terrain, the computer system including a monitor and a database storing three-dimensional visualization data of the surface of at least a portion of the Earth, the computer system being programmed to:
  receive coordinates of the position of the at least one wind turbine;
  receive a digital image of the at least one wind turbine;
  superimpose the digital image on said three-dimensional visualization data at the coordinates of the position of the at least one wind turbine; and
  cause the monitor to display a three-dimensional image of the at least one wind turbine as located at said coordinates.

25. A computer system according to embodiment 24, further programmed to receive a user-defined view angle and cause the monitor to display the three-dimensional image as seen from the user-defined view angle.

The invention claimed is:

1. A method for determining a position for at least one wind turbine within a confined geographical target region, the method comprising:
  defining a plurality of geographical locations within the target region;
  determining a plurality of wind flow characteristics in each of said geographical locations, said flow characteristics including at least a wind velocity and a turbulence intensity;
  applying a function, which defines a relationship between a maintenance parameter of the at least one wind turbine and at least said flow characteristics, to each of the geographical locations within the target region to compute, using one or more computer processors, a value of the at least one maintenance parameter at each of the geographical locations within the target region, wherein the maintenance parameter is associated with at least one of a cost, a risk and an activity for maintaining one or more components of the wind turbine; and
  selecting one of the geographical locations as the position for the at least one wind turbine on the basis of the computed maintenance parameter values.

2. The method according to claim 1, further comprising:
  receiving meteorological measurement data obtained at one of the geographical locations, said meteorological measurement data including at least wind velocities, wind directions and turbulence intensities;
  extrapolating the meteorological measurement data by means of a numerical method using the one or more computer processors to obtain said plurality of wind flow characteristics in each of the geographical locations within the geographical region.

3. The method according to claim 1, further comprising an output device for outputting a representation of the computed values of the at least one maintenance parameter, the output device including a monitor, and wherein the representation of the computed maintenance parameter values includes a map of the geographical target region, in which the computed maintenance parameter value in each of the geographical locations is represented in the corresponding positions in the map.

4. The method according to claim 1, wherein said function expressing the maintenance parameter of the wind turbine further is a function of a time-dependent variable.

5. The method according to claim 4, wherein the time-dependent variable is one of: time and accumulated power production of the at least one wind turbine.

6. The method according to claim 1, wherein the at least one maintenance parameter is a maintenance parameter of at least one component of the wind turbine.

7. The method according to claim 1, further comprising, during application of said function, the step of estimating the expected number of replacements of a given wind turbine component during the expected life time of the wind turbine.

8. The method according to claim 1, wherein the maintenance parameter includes a maintenance cost expressed as a monetary amount per energy unit produced.

9. The method according to claim 8, comprising the step of computing the maintenance cost as the sum of computed maintenance costs of a plurality of wind turbine components at a given time divided by the accumulated energy produced at that time.

10. The method according to claim 1, comprising the step of estimating at least one maintenance parameter of a plurality of wind turbines, and applying said function to take mutual aerodynamic effects of the wind turbines into account.

11. A computer system for determining a site for at least one wind turbine within a confined geographical target region, the computer system comprising:
  a computer processor; and
  a memory containing a program, that when executed on the computer processor, performs an operation for processing data, comprising:
    defining a plurality of geographical locations within the target region;
    determining a plurality of wind flow characteristics in each of said geographical locations, said flow characteristics including at least a wind velocity and a turbulence intensity;
    applying a function, which represents a relationship between a maintenance parameter of the at least one wind turbine and at least said flow characteristics, to each of the geographical locations within the target region to compute a value of the at least one maintenance parameter at each of the geographical locations within the target region, wherein the maintenance parameter is associated with at least one of a cost, a risk and an activity for maintaining one or more components of the wind turbine; and
    selecting one of the geographical locations as the position for the at least one wind turbine on the basis of the computed maintenance parameter values.

12. The computer system according to claim 11, further comprising:
  receiving meteorological measurement data obtained at one of the geographical locations, said meteorological measurement data including at least wind velocities, wind directions and turbulence intensities;
  extrapolating the meteorological measurement data by means of a numerical method using the one or more computer processors to obtain said plurality of wind flow characteristics in each of the geographical locations within the geographical region.

13. The computer system according to claim 11, wherein the function is a density function that, when executed on the computer processor, yields a value of the maintenance parameter.

* * * * *